United States Patent
Huang et al.

(10) Patent No.: US 9,547,967 B2
(45) Date of Patent: Jan. 17, 2017

(54) ENVIRONMENT DETECTION ALARM SYSTEM

(71) Applicants: Chun-Ming Huang, Hsinchu (TW); Chen-Chia Chen, Hsinchu (TW); Gang-Neng Sung, Hsinchu (TW)

(72) Inventors: Chun-Ming Huang, Hsinchu (TW); Chen-Chia Chen, Hsinchu (TW); Gang-Neng Sung, Hsinchu (TW)

(73) Assignee: NATIONAL APPLIED RESEARCH LABORATORIES, Hsinchu (TW)

( * ) Notice: Subject to any disclaimer, the term of this patent is extended or adjusted under 35 U.S.C. 154(b) by 0 days.

(21) Appl. No.: 14/677,972

(22) Filed: Apr. 2, 2015

(65) Prior Publication Data

US 2016/0260305 A1   Sep. 8, 2016

(30) Foreign Application Priority Data

Mar. 2, 2015   (TW) .............................. 104203069 U

(51) Int. Cl.
*G08B 17/10*   (2006.01)

(52) U.S. Cl.
CPC ..................... *G08B 17/10* (2013.01)

(58) Field of Classification Search
CPC ..................................................... G08B 17/10
See application file for complete search history.

(56) References Cited

U.S. PATENT DOCUMENTS

| 2010/0247403 | A1 | 9/2010 | Hancock | |
|---|---|---|---|---|
| 2013/0093593 | A1 | 4/2013 | Woods | |
| 2014/0361888 | A1* | 12/2014 | Huang | G08B 5/36 340/539.1 |
| 2014/0361901 | A1 | 12/2014 | Hoefer | |
| 2014/0375343 | A1* | 12/2014 | Chen | G01K 13/00 324/750.02 |

* cited by examiner

*Primary Examiner* — Leon Flores

(57) ABSTRACT

The system includes a control module, an environment detection unit and an electricity generation module. The control module includes a control unit for data processing and operating and an alarm unit, electrically connected to the control unit for receiving a command of the control unit. The environment detection unit is electrically connected to the control unit of the control module for detecting a physical quantity of environmental matter to generate a signal to send back to the control unit. The electricity generation module is electrically connected to the control module and has an electricity generator for generating electricity by environmental energy to supply the control module and the environment detection unit.

7 Claims, 2 Drawing Sheets

ENVIRONMENT DETECTION ALARM SYSTEM

BACKGROUND OF THE INVENTION

1. Technical Field

The invention relates to detection systems, particularly to a self-powered environment detection alarm system.

2. Related Art

The autumn and winter are a dangerous period of carbon monoxide poisoning. The reason of most cases of carbon monoxide poisoning is indoors installing a water heater with poor ventilation. Under such a condition, incomplete combustion of water heaters will generate a large amount of carbon monoxide and easily result in carbon monoxide poisoning. Carbon monoxide (CO) is hard to be observed because it is a colorless, odorless, and tasteless gas. People are not aware of carbon monoxide when they suffer from carbon monoxide poisoning.

To prevent carbon monoxide poisoning, the best solution is to install a water heater outdoors and keep good ventilation. Besides this, the final method to prevent carbon monoxide poisoning is to install a carbon monoxide detector indoors or near a water heater. Such a carbon monoxide detector can warn users.

A typically conventional carbon monoxide alarm device or detector uses a detecting unit to sense concentration of carbon monoxide and an alarm with a buzzer and/or light. However, such a gas detector has to be powered by a battery or an electric power source.

Carbon monoxide will be generated only while a water heater is being used. But a carbon monoxide detector continuously operates 24 hours and always consumes electricity. It is possible that a carbon monoxide detector cannot work because of no power. This will be very dangerous for users.

SUMMARY OF THE INVENTION

An object of the invention is to provide an environment detection alarm system, which has a self-supplied power source. The energy of such a power source comes from fluid, light, heat or pressure and can supply electricity continuously to prevent the alarm system from being unworking.

To accomplish the above object, the environment detection alarm system of the invention includes a control module, an environment detection unit and an electricity generation module. The control module includes a control unit for data processing and operating and an alarm unit, electrically connected to the control unit for receiving a command of the control unit. The environment detection unit is electrically connected to the control unit of the control module for detecting a physical quantity of environmental matter to generate a signal to send back to the control unit. The electricity generation module is electrically connected to the control module and has an electricity generator for generating electricity by environmental energy to supply the control module and the environment detection unit.

DETAILED DESCRIPTION OF THE INVENTION

Figure 1:
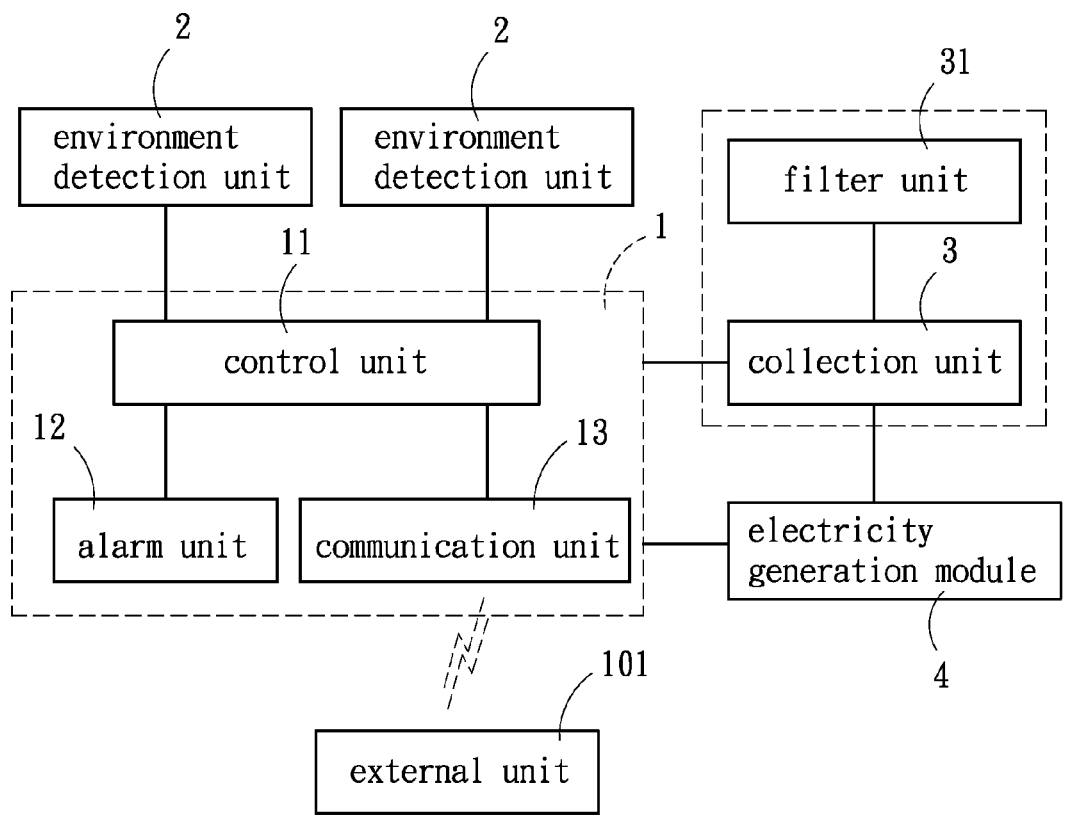
FIG. 1 is a block diagram of the invention.

Please refer to FIG. 1. The environment detection alarm system of the invention primarily includes a control module 1. The control module 1 has a control unit 11 for data processing and operating. The control unit 11 separately electrically connects an alarm unit 12 and a communication unit 13. The alarm unit 12 receives commands or information from the control unit 11 and emits sound, text, graph or light or a combination of two or more to warn users. The communication unit 13 sends a communication signal to an external unit 101 when receiving the commands or information from the control unit 11. The external unit 101 may be an electromagnetic valve, which can automatically close when receiving a signal from the communication unit 13. Alternatively, the external unit 101 may be a smart mobile device such as a smartphone or tablet computer, which can automatically call a specific person when receiving a signal from the communication unit 13.

The control module 1 electrically connects at least one environment detection unit 2. In the shown embodiment, the environment detection unit 2 is two in number. The environment detection units 2 directly electrically connect the control unit 11. The environment detection units 2 may vary quantity depending on kinds of substances to be detected, which include gas, liquid or other physical quantity. The environment detection units 2 are used for detecting concentration of the substances to generate a signal to send back to the control unit 11 of the control module 1. The control unit 11 will determine if the detected concentration reaches the threshold of danger or not.

Figure 2:
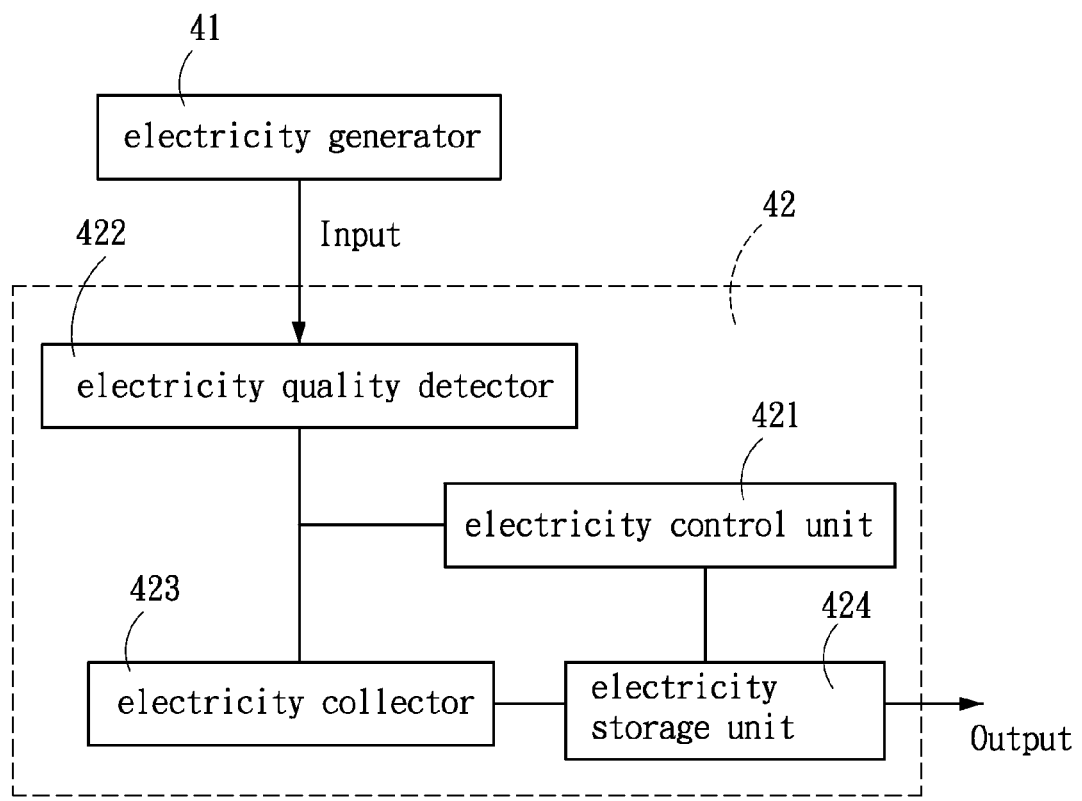
FIG. 2 is a block diagram of the electricity generation module of the invention.

The control module 1 further electrically connects a collection unit 3 such as a fan, pump, light collector or heat collector. For example, a collection unit 3 is a fan, which is used to generate convection to promote the substances to be detected to near the environment detection unit 2. The collection unit 3 electrically connects a filter unit 31 for excluding interference. The control module 1 and the collection unit 3 electrically connect an electricity generation module 4. The electricity generation module 4 utilizes environmental fluid, light, heat or pressure to drive a device to generate electricity to supply the control module 1, the environment detection unit 2 and the collection unit 3. The electricity generation module 4 further includes an electricity generator 41 and a power status detector 42. As shown in FIG. 2, the electricity generator 41 may be a wind power generator, water power generator, solar power generator, heat power generator or pressure power generator. The power status detector 42 electrically connects the electricity generator 41 to detect its power from the electricity generator 41 is enough or not.

The power status detector 42 further includes an electricity control unit 421. The electricity control unit 421 electrically connects an electricity quality detector 422, an electricity collector 423 and an electricity storage unit 424. The electricity control unit 421 is used for receiving and processing electrical information and then sending a signal to the control unit 11 to inform an electricity status. The electricity quality detector 422 receives and detects the electricity from the electricity generator 41 and informs the electricity control unit 421 the electricity status. The electricity quality detector 422 will directly output the electricity and send an OK signal to the control unit 11 if the electricity status is enough. Electricity will be collected by the electricity collector 423 and then stored in the electricity storage unit 424 if the input electricity is not enough. The electricity control unit 421 will not send an OK signal to the control unit 11 and output the electricity stored until the electricity in the electricity storage unit 424 is enough to supply to overall system for a single detection.

It will be appreciated by persons skilled in the art that the above embodiment has been described by way of example only and not in any limitative sense, and that various alterations and modifications are possible without departure from the scope of the invention as defined by the appended claims.

What is claimed is:

1. An environment detection alarm system, comprising:
a control module comprising:
   a control unit for data processing and operating; and
   an alarm unit, electrically connected to the control unit for accepting an command of the control unit to operate;
an environment detection unit, electrically connected to the control unit of the control module for detecting a physical quantity of environmental matter to generate a signal to send back to the control unit; and
an electricity generation module, electrically connected to the control module, comprising an electricity generator for generating electricity by environmental energy to supply the control module and the environment detection unit;
wherein the control module further electrically connects a collection unit, the collection unit electrically connects the electricity generation module, the collection unit promotes substances to be detected to near the environment detection unit, and the collection unit electrically connects a filter unit for excluding interference.

2. The environment detection alarm system of claim 1, wherein the alarm unit emits sound, text, graph or light or a combination of two or more for warning.

3. The environment detection alarm system of claim 1, wherein the control module further comprises a communication unit, the communication unit electrically connects the control unit for sending out a communication signal when receiving a command from the control unit.

4. The environment detection alarm system of claim 1, wherein the collection unit is a fan, pump, light collector or heat collector.

5. The environment detection alarm system of claim 1, wherein the electricity generation module comprises a power status detector, the power status detector electrically connects the electricity generator, the power status detector further comprises:
an electricity control unit for receiving and processing electrical information and then sending a signal to the control unit to inform an electricity status; and
an electricity quality detector, electrically connecting the electricity control unit for receiving and detecting electricity from the electricity generator and informing the electricity control unit an electricity status.

6. The environment detection alarm system of claim 5, wherein the power status detector further comprises an electricity collector and an electricity storage unit, which electrically connect each other and the electricity control unit.

7. The environment detection alarm system of claim 1, wherein the electricity generator is a wind power generator, water power generator, solar power generator, heat power generator or pressure power generator.

* * * * *